(12) United States Patent
Bergenheim

(10) Patent No.: US 6,419,316 B1
(45) Date of Patent: Jul. 16, 2002

(54) CHILD SEAT FOR VEHICLES

(75) Inventor: Eddy Bergenheim, Västra Frölunda (SE)

(73) Assignee: Volvo Person vagnar AB (SE)

( * ) Notice: Subject to any disclaimer, the term of this patent is extended or adjusted under 35 U.S.C. 154(b) by 0 days.

(21) Appl. No.: 09/616,413

(22) Filed: Jul. 14, 2000

Related U.S. Application Data

(63) Continuation of application No. PCT/SE99/00020, filed on Jan. 12, 1999.

(30) Foreign Application Priority Data

Jan. 23, 1998 (SE) ................................. 9800192

(51) Int. Cl.⁷ ................................. A47D 1/10
(52) U.S. Cl. ................................. 297/250.1
(58) Field of Search .............................. 297/250.1, 484, 297/475

(56) References Cited

U.S. PATENT DOCUMENTS 5,098,161 A  3/1992  Minami et al.
5,294,185 A  3/1994  Koyanagi et al.

FOREIGN PATENT DOCUMENTS

| DE | 4412981 C1 | 8/1995 |
| DE | 19537169 A1 | 4/1996 |
| EP | 0287259 A2 | 10/1988 |
| EP | 0295838 A1 | 12/1988 |
| EP | 0656285 A1 | 6/1995 |
| EP | 0770515 A2 | 5/1997 |
| FR | 2750372 A1 | 1/1998 |
| WO | 92/14627 | * 9/1992 |

* cited by examiner

*Primary Examiner*—Milton Nelson, Jr.
(74) *Attorney, Agent, or Firm*—Kilpatrick Stockton LLP

(57) ABSTRACT

A child seat for vehicles having a seat, a backrest and a vertically adjustable seat belt. The vertically adjustable seat belt includes at least one belt band, equipped with a locking device arranged for lockable co-operation with a belt lock that is fixedly anchored in the child seat. The backrest is designed with at least one vertically extending slot, with the belt band arranged to run through the slot and up to the belt lock. The improved child seat provides an automatic adjustment of a safety belt in relation to the body size of the passenger is obtained.

7 Claims, 4 Drawing Sheets

CHILD SEAT FOR VEHICLES

RELATED PATENT APPLICATIONS

This is a continuation patent application of International Application No. PCT/SE99/00020 filed Jan. 12, 1999 also entitled CHILD SEAT FOR VEHICLES that designates the United States. The full disclosure of said application, in its entirety, is hereby expressly incorporated by reference into the present application.

TECHNICAL FIELD

The present invention relates to a child seat for vehicles according to the preamble of the accompanying claim 1. The invention is particularly intended for use in connection with that type of child seats, which is provided with safety belts.

BACKGROUND OF THE INVENTION

In connection with vehicles, e.g. passenger cars, safety belts are used in a known manner to protect those traveling in the vehicle. In the case of a collision or of hard braking, the passenger can be retained in his seat by means of the safety belt, which provides enhanced safety.

Normal vehicle seats and safety belts are not adapted and dimensioned for achieving optimum protective action where the passenger is a small child. For this reason it is previously known to use special child seats, more particularly in the form of separate child seats that can be detachably fitted in one of the existing vehicle seats. Child seats, particularly those for infants, are commonly adapted to be fitted in a reverse position in the passenger seat of the vehicle, i.e., so that the passenger in the child seat will be traveling with his back turned towards the front of the vehicle. Hereby, a high safety is achieved for the passenger in the child seat in case of a collision or of hard braking.

It is known in the art to provide detachable child seats with a safety belt with the intention of providing a particularly high safety level. In this way, the child traveling in the child seat can be fastened and prevented from being thrown out of the child seat, for example, in a collision. Regarding the function of the safety belt, there is a general requirement to arrange it so as to run from a point behind the passenger and to be redirected at a point close to the shoulders of the passenger, i.e., at a position adapted to the length of the passenger.

Against this background, it is previously known to provide a child seat with a safety belt that has an adjustable height thereby being able to adapt to children having different body sizes. For example, within a family there may be a need for letting different children with different body sizes use the same child seat on different occasions. A requirement for adjusting the safety belt may also occur depending upon the clothing worn by the child seated in the child seat. For example, children may often change from thick winter clothing to thinner clothes. This will also contribute to the requirement of being able to adjust the height of the safety belt. In summary, it can be stated that a height-adjustable safety belt in a child seat provides an opportunity of achieving an optimum protective action for the child, in general independently of the child's body size or of the thickness of the clothing worn by the child.

A previously known child seat comprising a vertically adjustable safety belt is shown in U.S. Pat. No. 5,098,161. The child seat according to this document is detachably arranged on an existing seat of a vehicle and is provided with a safety belt by which a child can be fastened. The safety belt is designed with two belt bands running from two points above each shoulder of the child and onto a fastening element, which in turn is adapted to be fastened into a lock in the seat of the child seat between the child's legs.

The child seat of U.S. Pat. No. 5,098,161 adapts to children of varying size by providing the backrest of the seat with a number of vertically spaced openings. The two belt bands may then be arranged to run through appropriately selected openings in the backrest. Depending on the size of the child, the belt band can be detached from a previously selected opening and moved to another opening, giving the optimum fit for the passenger of the child seat.

Although the known child seat discussed above generally functions to satisfaction, it has one substantial drawback in that it is cumbersome and time-consuming to rearrange the belts traps vertically. As small children grow quickly, the child seat will have to be adjusted frequently, and, this being a cumbersome operation, it may easily be neglected, which might in turn entail that the child seat will not provide the desired protective action in case of a collision.

In view of the above described deficiencies associated with conventionally designed child seats, the present invention has been developed. These enhancements and benefits are described in greater detail hereinbelow with respect to several alternative embodiments of the present invention.

SUMMARY OF THE INVENTION

The present invention in its several disclosed embodiments alleviates the drawbacks described above with respect to conventionally designed child seats for vehicles and incorporates several additional beneficial features.

The object of the present invention is to provide an improved child seat for vehicles, which solves the above problem and which provides an automatic vertical adjustment according to the body size of the child. This object is achieved by a device, the characteristics of which are stated in the accompanying claim 1.

The child seat according to the invention comprises a seat, a backrest and a vertically adjustable seat belt consisting of at least one belt band, equipped with a locking device arranged for lockable co-operation with a belt lock that is fixedly anchored in said child seat. The backrest of the present invention is designed with at least one vertically extending slot, with the belt band arranged to run through said slot and up to said belt lock. When a child is placed and fastened into the child seat according to the invention, each individual belt band will automatically adapt to the body size of the child so as to run over the shoulder portion of the child. Accordingly, the belt band in question can thus be adapted to the passenger of the child seat, in general, independently of the body size, or of the clothes worn by the child.

According to a preferred embodiment of the invention, it is utilized as a separate child seat, for detachable attachment into an existing seat of a vehicle. Preferred embodiments of the invention are further defined in the accompanying dependent claims.

The term "child seat" in this context refers to a particularly designed location in a vehicle that is intended primarily for children of an age of up to about 4 years. This term comprises detachable child seats as well as parts of existing, fixedly mounted vehicle seats. The term "child seat" shall further be regarded as comprising seats turned either forwards or backwards in relation to the traveling direction of the vehicle.

BRIEF DESCRIPTION OF THE DRAWINGS

The invention will now be described in greater detail in the following way, by example only, and with reference to the attached drawings, in which.

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. The figures are not necessarily to scale, some features may be exaggerated or minimized to show details of particular components or processes. Therefore, specific structural and functional details disclosed herein are not to be interpreted as limiting, but merely as a basis for the claims and as a representative basis for teaching one skilled in the art to variously employ the present invention.

Figure 1:
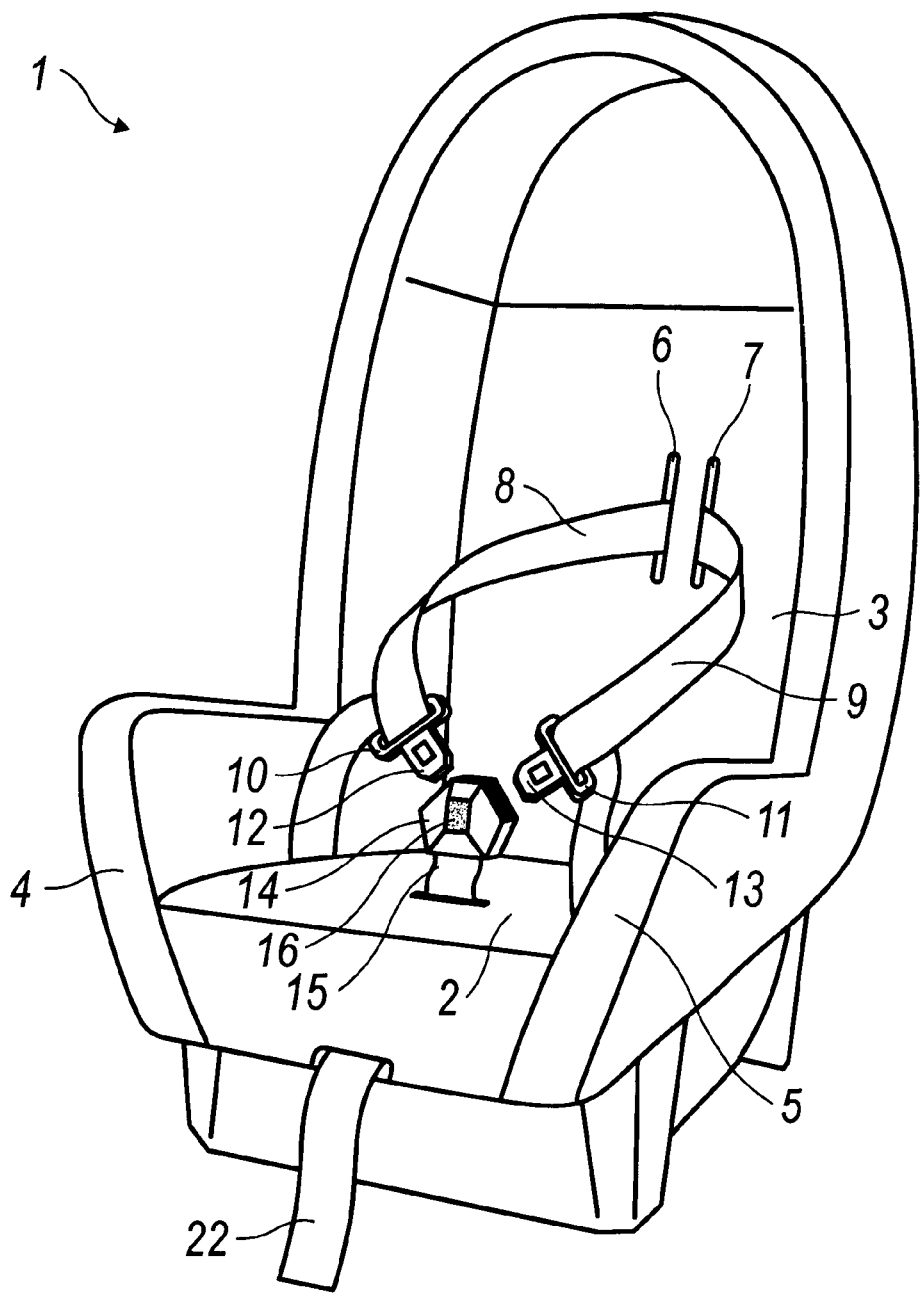
FIG. 1 shows a front view of a child seat according to an embodiment of the present invention.

FIG. 1 illustrates a somewhat simplified front view of a child seat according to the present invention. According to a preferred embodiment, the invention is shaped as a separate child seat 1 intended for detachable mounting inside a vehicle, e.g., a passenger car. The child seat 1 is constructed with a seat 2 and a backrest 3, and is preferably manufactured from a hard plastic shell with soft padding in appropriate places. The hard plastic shell is then conveniently covered by upholstery made, for example, of a textile material. The seat 2 is bound sideways by two seat sides 4, 5. Preferably, the backrest 3 is somewhat bowl-shaped, i.e., has an extension in depth. In this way a child, preferably with an age of from newborn up to about 4 years, can travel in the child seat 1 and thereby be retained in a safe way.

In one manner of use, the child seat 1 is mounted in a reverse direction in the vehicle in question, i.e., with the backrest 3 turned towards the front of the vehicle. To this end, the child seat 1 comprises fastening elements (not shown) for attachment preferably in the front passenger seat of the vehicle, i.e., the seat beside the driver's seat. Such fastening elements may preferably be comprised of one or more loops or hooks, thereby providing attachments for an existing safety belt for retaining the child seat 1 in the passenger seat.

According to the invention, the backrest 3 is designed with a first through slot 6 and a second through slot 7, both of which extend through the backrest 3. The slots 6, 7 are preferably straight, elongated and generally oriented vertically, but other configurations are also conceivable. Furthermore, the child seat 1 is provided with a safety belt comprising a first belt band 8 and a second belt band 9 running through the slots 6 and 7, respectively. The two belt bands 8, 9 are, in a conventional manner, made of a woven band of textile or a corresponding material. Each belt band 8, 9 is arranged to run freely through a locking unit 10, 11. The locking unit 10, 11 is in the form of a handle carrying a locking plate 12, 13. Further, the belt bands 8, 9 run from the slots 6, 7 to a fixation point in the seat 2, preferably adjacent to each seat side 4, 5, respectively. The two locking plates 12, 13 may, in a known manner, be locked into a further locking device in the form of a belt lock 14. This belt lock is in turn fixedly anchored in the seat 2 via a short band 15, preferably of the same type of material as the belt bands 8, 9.

According to a conceivable variant of the invention (not shown in the figures), each belt band 8, 9 may be fixedly attached to each locking unit 10, 11, respectively, i.e., without running on further to a fastening point in the seat 2.

FIG. 1 shows the child seat 1 according to the invention in a state where the locking units 10, 11 are not locked into the belt lock 14. For locking of the locking units 10, 11, the locking plates 12, 13 may be inserted into receiving openings (not shown) of the belt lock 14. Each locking plate 12, 13 may be locked inside the belt lock 14 according to any manner known in the art based on a locking element with a catch arranged inside the belt lock 14 and cooperating with each locking plate 12, 13 and is therefore not described in detail here. The locking plates 12, 13 may further be released from the belt lock 14 by means of a separate release button 16.

Figure 2:
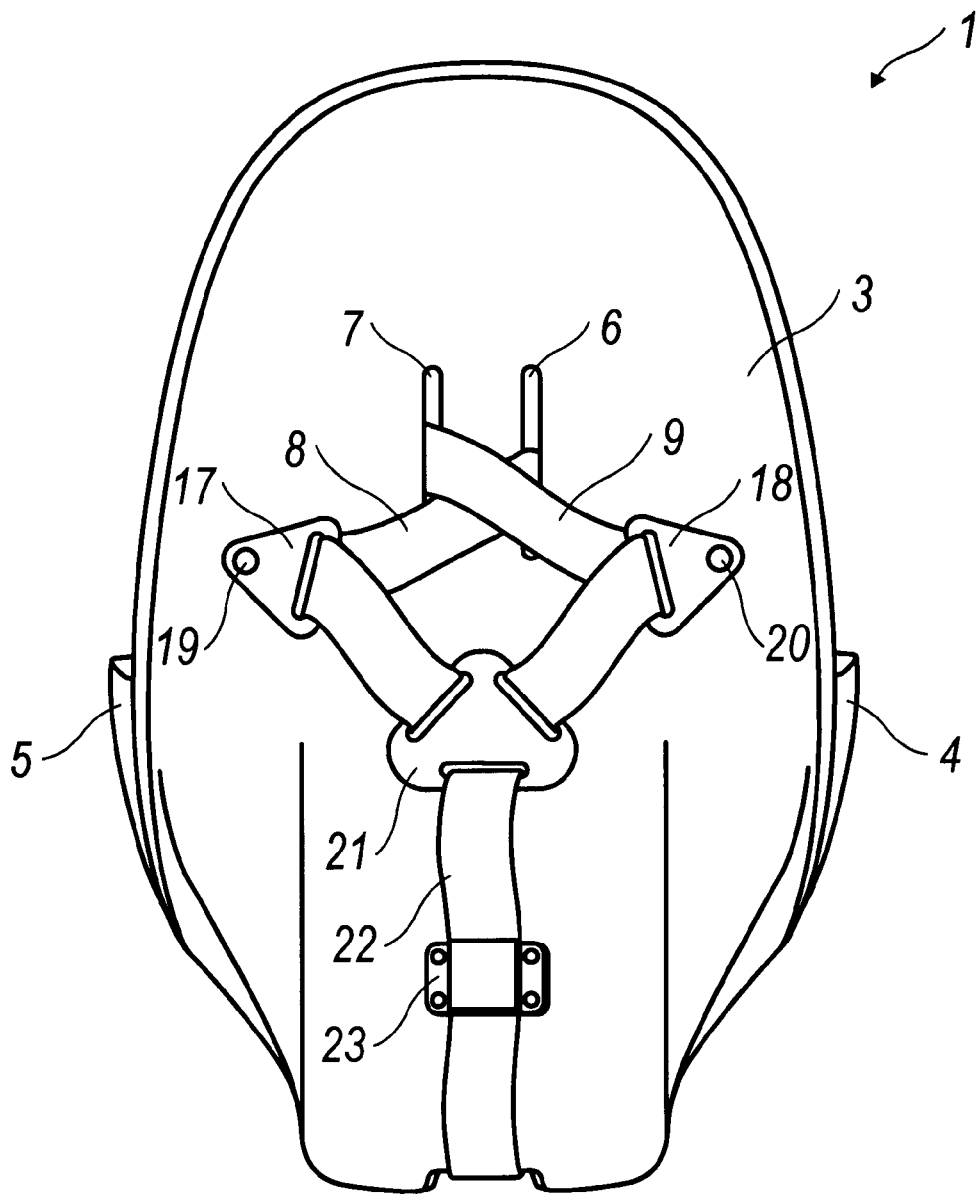
FIG. 2 shows a rear view of a child seat according to an embodiment of the present invention.

FIG. 2 shows a rear view of the child seat 1 illustrating one method of how the belt bands 8, 9 may be attached to the rear side of the backrest 3. As previously explained, the slots 6, 7 extend through the backrest 3 so that each belt band 8, 9 comes out on the rear side of the child seat 1. Furthermore, those portions of the belt bands 8, 9 running along the rear side of the backrest 3 are arranged so as to cross each other. The first belt band 8 runs through a re-directing device in the form of a first guide plate 1 7 pivotally attached to the rear side of the backrest 3 by means of a fastening screw 19. In a corresponding manner, the other belt band 9 is arranged to run through a redirecting device in the form of a second guide plate 18. This plate 18 is pivotally attached to the rear side of the backrest 3 by means of another fastening screw 20. Both guide plates 17, 18 can pivot freely in relation to the remainder of the child seat 1.

The end portions of the belt bands 8, 9 are attached to a fastening plate 21. This fastening plate 21 is a loose member, i.e., it is free from or not attached to the child seat 1. Also attached to the fastening plate 21 is the end portion of another band 22. This band 22 is of the same type as the above-mentioned belt bands 8, 9, 15, and arranged to run through a guiding device 23 in the shape of a mounting or plate on the rear side of the backrest 3. The band 22 runs from the guiding device 23 along the bottom side of the child seat 1 to the front side of the seat 1 (see FIG. 1) where the band 22 protrudes.

The child seat 1 further comprises an attachment device (not shown) arranged to allow alternate loosening and tightening of the band 22. In this way, a person can simply place a child in the child seat 1, then fasten it by locking the locking units 10, 11 and subsequently lock the band 22 that protrudes on the front side of the child seat 1 in a suitable position.

Preferably, the rear side of the backrest 3 is designed so as not to prevent any movement of the various bands 8, 9, 22. For example, if the child seat 1 is placed in such a way that the backrest 3 is turned towards a vehicle instrument panel, it is important that the bands 8, 9, 22 not be pinched between the instrument panel and the child seat 1, thereby preventing any movement of the bands 8, 9, 22, and, in turn, possibly impairing the function of the safety belt. In order to prevent this, the invention may be arranged so as to shape the rear side of the backrest 3 with a countersunk portion (not illustrated), housing the bands 8, 9, 22. Such a countersunk portion may then preferably be covered by a thin sheet or plate.

The slots 6, 7 are shaped with a width adapted for allowing the belt bands 8, 9 to run freely in a direction through the slots 6, 7, respectively, as well as vertically along the length of slots 6, 7, respectively. Preferably, the width of the slots 6, 7 is in the range of 0.5–2.0 cm. Furthermore, the slots 6,7 have a vertical extension corresponding to that height, within which the shoulder portion of a child seated in the child seat 1 can be expected to be located. The vertical mobility of the belt bands 8, 9 is achieved by the vertical length of the slots 6, 7 being substantially larger than the width of the belt bands 8, 9, respectively. Suitably, the child seat 1 according to the invention is used for children of ages up to about 4 years, whereby the length of the slots 6, 7 is of the order 10–20 cm.

After having placed a child in the child seat 1 according to the invention, the child can be fastened by initially placing the belt bands 8, 9 over each shoulder portion of the child and then locking them into the belt lock 14 (comp. FIG. 1). For this purpose, the belt lock 14 is located at a point in front of the child's abdomen, the band 15 running between the legs of the child to a fastening point in the seat 2. Due to the vertical mobility of the belt bands 8, 9 in the slots 6, 7, the extension of each belt band 8, 9 will, according to the invention, automatically be adapted to the body size of the child, and can always be made to run over the shoulder portion of the child.

On the rear side of the backrest 3 (comp. FIG. 2) each guide plate 17, 18 will pivot to a position dependent on the vertical position of each belt band 8, 9 in the slots 6,7, respectively. With the belt bands 8, 9 locked in place, the band 22 should be tightened and fixed in the manner described above. In this way, the child seat 1 can be used for children of various body size with the belt bands 8, 9 providing optimum protection, in general, independently of the body size of the child. For adaptation of the safety belt to the body size of the child, the band 15 may furthermore be provided with a length adjustment mechanism (not shown) for correct positioning of the belt lock 14.

Figure 3:
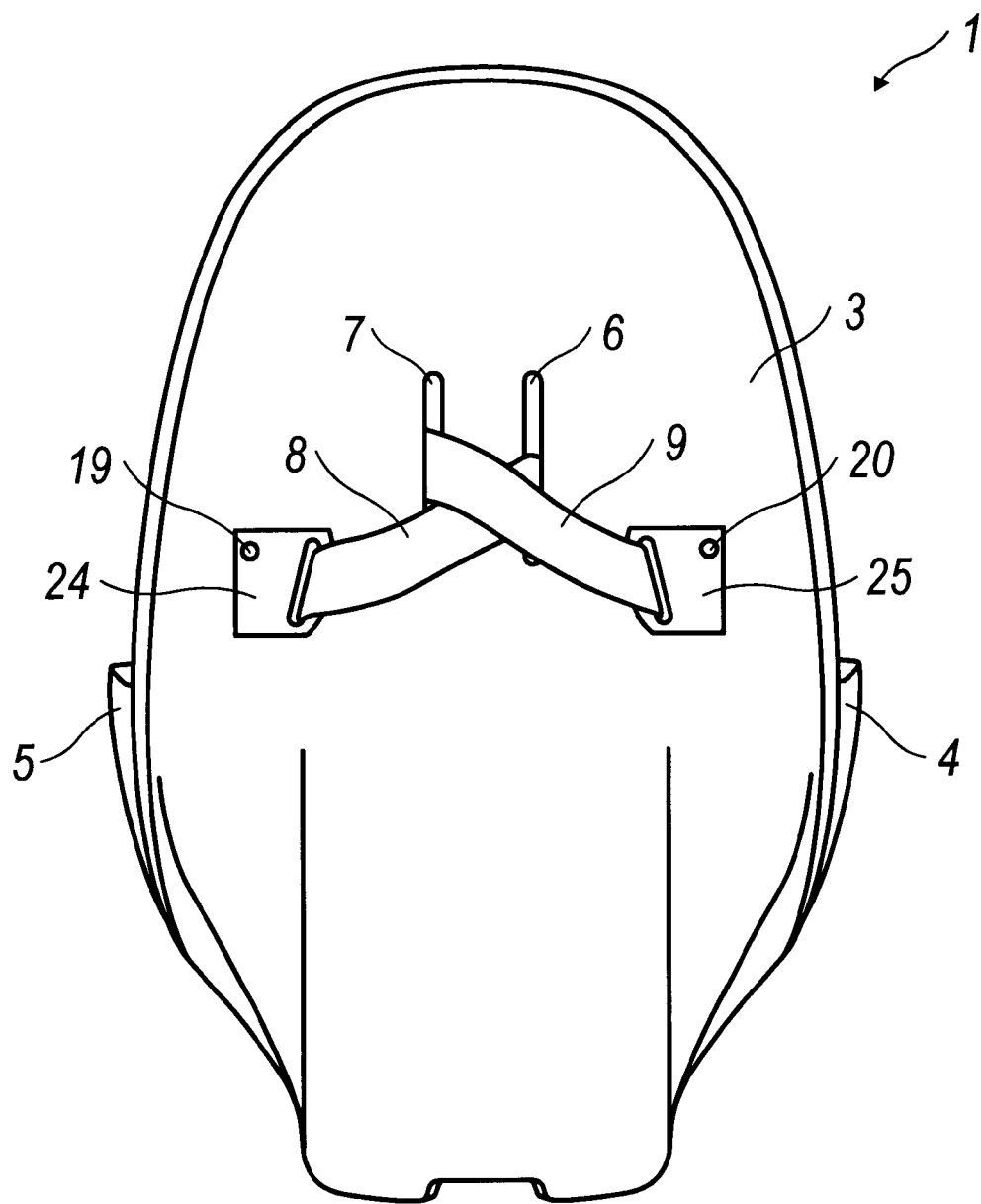
FIG. 3 shows a rear view of a child seat according to an embodiment of the present invention.

FIG. 3 shows a rear view of a child seat illustrating one method of how the belt bands 8, 9 may be attached to the rear side of the backrest 3 using rollers 24, 25. Such rollers 24, 25 are known in the art and are designed to be spring loaded, rolling up its adherent belt band automatically when not in use. When the safety belt is not in use, the belt bands 8, 9 will thus be rolled up and each locking unit 10, 11 will be positioned right in front of their respective slots 6, 7. Such a roller would be fitted to the backrest in an articulated manner similar to that of the guide plates 17, 18 described above. According to this embodiment, two belt rollers 24, 25 can thus be used to replace the guide plates 17, 18, the fastening plate 21 and the band 22 described above.

Figure 4:
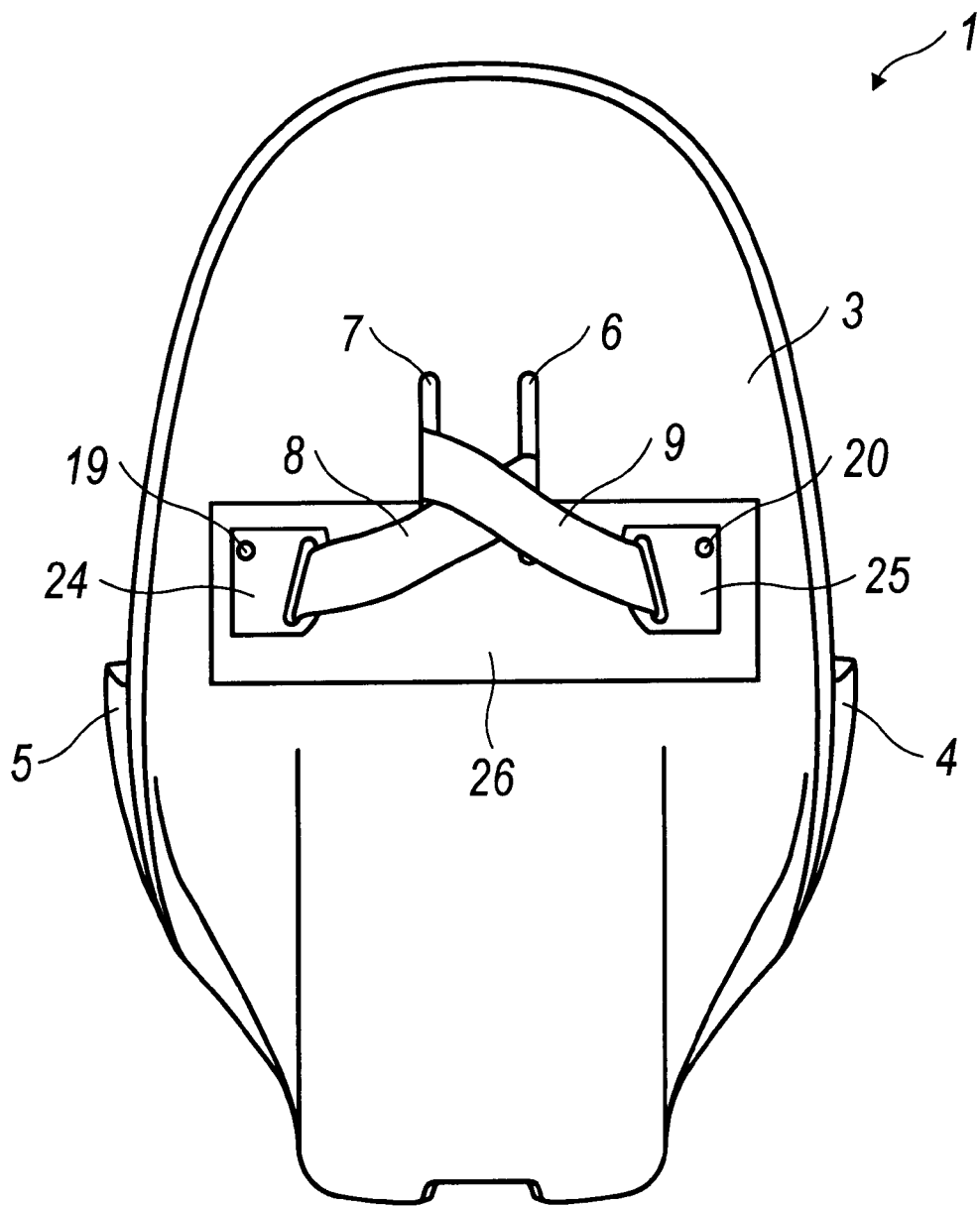
FIG. 4 shows a rear view of a child seat according to an embodiment of the present invention.

FIG. 4 shows a variation of this alternative embodiment, the belt rollers 24, 25 may be arranged inside the backrest 3 instead of on its rear side. In this case, the two slots 6, 7 will not extend all the way through the backrest 3, but only through the front side of the backrest 3, i.e., that side facing the passenger in the child seat 1. The belt rollers 24, 25 will then be arranged in a cavity 26 defined inside the backrest 3, i.e., between its front and rear sides.

The invention is not limited to the embodiment examples described above and depicted in the drawings, but may be varied within the scope of the appended patent claims. For example, the invention can also be used in those cases where the child seat 1 is placed facing forwards, i.e., where the passenger in the child seat 1 is facing towards the front of the vehicle.

Furthermore, the invention can in principle also be used in those cases where the safety belt only consists of a belt band running diagonally across the upper part of the body of the passenger. In this case, only one through slot in the backrest of the child seat is used. Likewise, the invention may be used in connection with safety belts of the three, four or five point types.

The invention can be completed with various mechanisms for tightening the belt bands 8, 9. For example, each belt band 8, 9 can be provided with a device for adjusting the length of the respective belt band 8, 9. Such devices would preferably be arranged at shoulder height for the passenger of the child seat 1.

The child seat according to the invention may further comprise part of an existing vehicle seat, e.g., an integrated part of the rear seat of a vehicle or an integrated part of the backrest of the front passenger seat.

It should be understood that the child seat according to the invention is not limited for use by passengers of a certain age or body size. The invention, however, is mainly suitable for children up to about 4 years of age.

The slots 6, 7 may be made rectilinear or, alternatively, somewhat curved in shape in order to be adapted in an optimal way to the body shape of a passenger in the child seat 1. Moreover, the slots 6, 7 may be oriented completely vertically or alternatively somewhat obliquely relative to the vertical line.

Finally, the two guide plates 17, 18 (see FIG. 2) may be arranged such that they are adjustable vertically or transversally. This can be achieved by displaceably arranging the guide plates 17, 18 along a groove or the like and providing them with a locking mechanism, e.g., in the form of a spring-biased cotter pin, by which each guide plate 17, 18 can be adjusted to a suitable position.

What is claimed and desired to be secured by Letters Patent is as follows:

1. A child seat for vehicles comprising:

a seat, a backrest and a vertically adjustable seat belt consisting of at least one belt band equipped with a locking device arranged for lockable co-operation with a belt lock that is fixedly anchored in said child seat, wherein said backrest is designed with at least one vertically extending slot, and wherein said belt band is arranged to run from a fastening point provided on the side opposite the backrest, through said slot, and to said belt lock, said fastening point comprising a loose fastening plate to which said belt band is fastened, said fastening plate being free from the child seat.

2. The child seat according to claim 1, wherein said slot is arranged at a position in the backrest that substantially corresponds to the expected location of the shoulder portion of a passenger traveling in the child seat.

3. The child seat according to claim 1, wherein said child seat is configured to be a detachable attachment in a vehicle, and comprises means for said attachment.

4. The child seat according to claim 1, further comprising two belt bands running through two slots in said backrest, said slots being located at the positions where a passenger in the child seat would be expected to place his or her shoulder portions.

5. The child seat according to claim 1, further comprising at least one link element for re-directing said belt band, said link element being pivotally attached to the backrest.

6. The child seat according to claim 1, wherein said fastening point is defined by a belt roller for automatic rolling-up of the belt band when not in use.

7. The child seat according to claim 6, wherein said belt roller is arranged in a cavity defined by the interior of the backrest.

* * * * *